US010503179B2

(12) United States Patent
Hayashi et al.

(10) Patent No.: US 10,503,179 B2
(45) Date of Patent: Dec. 10, 2019

(54) FLOW RATE CONTROL APPARATUS AND PROGRAM RECORDING MEDIUM HAVING RECORDED THEREIN PROGRAM FOR FLOW RATE CONTROL APPARATUS

(71) Applicant: HORIBA STEC, Co., Ltd., Kyoto-shi, Kyoto (JP)

(72) Inventors: Shigeyuki Hayashi, Kyoto (JP); Kentaro Nagai, Kyoto (JP); Masao Yamaguchi, Kyoto (JP)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 120 days.

(21) Appl. No.: 15/832,282

(22) Filed: Dec. 5, 2017

(65) Prior Publication Data
US 2018/0173249 A1    Jun. 21, 2018

(30) Foreign Application Priority Data

Dec. 15, 2016 (JP) .................. 2016-243813

(51) Int. Cl.
| G05D 7/00 | (2006.01) |
| G05D 11/00 | (2006.01) |
| G05D 7/06 | (2006.01) |
| F16K 37/00 | (2006.01) |

(52) U.S. Cl.
CPC ......... *G05D 7/0635* (2013.01); *F16K 37/005* (2013.01)

(58) Field of Classification Search
USPC ....................................... 700/282
See application file for complete search history.

(56) References Cited

U.S. PATENT DOCUMENTS

| 7,979,165 | B2 * | 7/2011 | Gotoh | G01F 1/6847 |
| | | | | 137/2 |
| 2006/0174707 | A1 * | 8/2006 | Zhang | G01M 3/243 |
| | | | | 73/592 |
| 2009/0125154 | A1 * | 5/2009 | Yli-Koski | G05B 13/04 |
| | | | | 700/282 |
| 2009/0248213 | A1 * | 10/2009 | Gotoh | G05D 7/0635 |
| | | | | 700/282 |
| 2013/0092258 | A1 * | 4/2013 | Yasuda | G01F 1/6842 |
| | | | | 137/487 |
| 2013/0103209 | A1 * | 4/2013 | Beck | G05D 7/0635 |
| | | | | 700/282 |

FOREIGN PATENT DOCUMENTS

JP          2015109022 A    6/2015

* cited by examiner

*Primary Examiner* — Md Azad
(74) *Attorney, Agent, or Firm* — Alleman Hall Creasman & Tuttle LLP

(57) ABSTRACT

A flow rate control apparatus is provided which enables high speed response particularly in a transient response state, such as when a target flow rate falls. The flow rate control apparatus includes: a valve provided with a position sensor to measure an opening degree and disposed in a flow channel; a flow rate sensor disposed upstream of the valve and provided with a restrictor; a first pressure sensor disposed downstream of the restrictor and disposed upstream of the valve; a second pressure sensor disposed downstream of the valve; a storage section to store a characteristic map indicating a relationship between at least the opening degree of the valve, a differential pressure before and after the valve, and a flow rate of a fluid passing through the flow channel; and a valve control section to control the valve so that the flow rate reaches an accepted target flow rate.

10 Claims, 9 Drawing Sheets

FLOW RATE CONTROL APPARATUS AND PROGRAM RECORDING MEDIUM HAVING RECORDED THEREIN PROGRAM FOR FLOW RATE CONTROL APPARATUS

BACKGROUND OF THE INVENTION

Field of the Invention

The present invention relates to a flow rate control apparatus including a fluid resistance element for constituting a flow rate sensor.

Background Art

A mass flow controller used for controlling a flow rate of a component gas or the like in recent semiconductor manufacturing processes requires high speed response in a transient state, such as when a target flow rate rises or falls.

For example, the volume of an internal flow channel of the mass flow controller has conventionally been reduced as much as possible in order to meet the above requirement.

However, volume reduction of the internal flow channel of the mass flow controller has almost reached its limit at present. In particular, it is difficult to meet a required level of response speed of a gas flow rate when the target flow rate falls.

Meanwhile, the inventor of the present application has found, as a result of intensive studies of the above problem, that the conventional mass flow controller has the following structural problem.

Specifically, in a mass flow controller for use in a semiconductor manufacturing process as disclosed in Patent Document 1, a pressure type flow rate sensor is disposed downstream of a valve. The flow rate sensor includes a fluid resistance element, such as an orifice and a laminar flow element, in order to obtain a differential pressure necessary for calculating a flow rate. Therefore, when the target flow rate falls, the fluid resistance element obstructs a flow of gas after passing through the valve, and consequently, the gas is accumulated upstream of the fluid resistance element. Therefore, even when an opening degree of the valve is increased, the flow rate of the gas flowing downstream is less likely to increase, thus failing to ensure that the flow rate of the gas is lowered at a desired response speed at the falling.

PRIOR ART DOCUMENT

Patent Document

Patent Document 1: Japanese Unexamined Patent Publication No. 2015-109022

SUMMARY OF THE INVENTION

Problems to be Solved by the Invention

The present invention has been made to solve the above problem and has for its main object to provide a flow rate control apparatus capable of achieving high speed response even in the transient state, for example, particularly when a target flow rate falls.

Means of Solving the Problems

In an embodiment of the present invention, a flow rate control apparatus includes a valve, a flow rate sensor, a first pressure sensor, a characteristic map storage section, a second flow rate calculation section, a state determination section, and a valve control section. The valve is provided with a position sensor to measure an opening degree, and is disposed in a flow channel that permits passage of a fluid. The flow rate sensor is disposed upstream of the valve and provided with a fluid resistance element. The flow rate sensor is designed to output a first flow rate. The first pressure sensor is disposed downstream of the fluid resistance element and disposed upstream of the valve. The characteristic map storage section is designed to store a characteristic map indicating a relationship between at least an opening degree of the valve, a differential pressure before and after the valve, and a flow rate of a fluid passing through the flow channel. The second flow rate calculation section is designed to calculate a second flow rate from the characteristic map on the basis of a measured opening degree being measured by the position sensor, and a first pressure being measured by the first pressure sensor. The state determination section is designed to determine whether a flow rate of a fluid passing through the flow channel is in a stable state or a transient state. The valve control section is designed to control the valve so that a flow rate of a fluid passing through the flow channel reaches an accepted target flow rate. When the state determination section determines as being in a stable state, the valve control section is designed to control an opening degree of the valve on the basis of the target flow rate and the first flow rate outputted from the flow rate sensor. When the state determination section determines as being in a transient state, the valve control section is designed to control an opening degree on the basis of the target flow rate and a second flow rate calculated by the second flow rate calculation section.

According to the above embodiment, because the fluid resistance element is disposed upstream of the valve, the fluid after passing through the valve does not pass through the fluid resistance element. Hence, the fluid resistance element does not obstruct a flow when decreasing the flow rate, so that the opening degree of the valve can be directly reflected in a change in flow rate.

Moreover, when the state determination section determines as being in the transient state, the valve control section, whose response speed is higher than that of the first flow rate outputted from the flow rate sensor, controls the valve with the second flow rate calculated by referring to the characteristic map. It is therefore possible to cause a change to an opening degree necessary for achieving a target flow rate in a short time.

Due to the synergistic effect by these two, it is possible to increase the response speed particularly when the target flow rate falls.

In order to achieve long-term reproducibility of the second flow rate calculated by referring to the characteristic map on the basis of a measured opening degree measured by the position sensor, thereby ensuring that the response speed in the transient state can be increased all the time, the flow rate control apparatus may further include a characteristic map update section to update a characteristic map being stored in the characteristic map storage section when the state determination section determines as being in a stable state, on the basis of a first flow rate being measured by the flow rate sensor, a first pressure being measured by the first pressure sensor, and a measured opening degree being measured by the position sensor.

In order that the influence of a fluid temperature on the fluid control can be taken into consideration, and that the response speed in the transient state can be further improved to enhance flow rate control accuracy, the characteristic map may indicate a relationship between a temperature of the fluid, an opening degree of the valve, a differential pressure before and after the valve, and a flow rate of a fluid passing through the flow channel.

In order to further reduce an error between the target flow rate and an actual flow rate by accurately obtaining a second pressure that is a pressure on the downstream side of the valve, the flow rate control apparatus may further include a second pressure sensor disposed downstream of the valve. The second flow rate calculation section is designed to calculate a second flow rate from the characteristic map on the basis of a measured opening degree being measured by the position sensor, a first pressure being measured by the first pressure sensor, and a second pressure being measured by the second pressure sensor.

In order that a relationship between a change in the second pressure on the downstream of the valve and a flow rate of the fluid passing through the valve can be accurately reflected in the characteristic map so as to further enhance the reproducibility of an actual flow rate, the flow rate control apparatus may be designed as follows. That is, when the state determination section determines as being in a stable state, the characteristic map update section is designed to update a characteristic map being stored in the characteristic map storage section, on the basis of a first flow rate being measured by the flow rate sensor, a first pressure being measured by the first pressure sensor, a second pressure being measured by the second pressure sensor, and a measured opening degree being measured by the position sensor.

In order to make it easier to enhance response speed and flow rate control accuracy, the flow rate sensor may further include an upstream-side pressure sensor disposed upstream of the fluid resistance element, and a first flow rate calculation section to calculate a first flow rate on the basis of an upstream-side pressure measured by the upstream-side pressure sensor, and a first pressure measured by the first pressure sensor. With the pressure type flow rate sensor, the measured flow rate has a high response speed, and it is accordingly easier to improve the response speed of flow rate control.

In a specific embodiment that makes it easier to use a characteristic map of a conventional flow rate control apparatus, the flow rate sensor further includes a branch pipe branched from an upstream side of the fluid resistance element and joined at a downstream side of the fluid resistance element, a pair of winding resistances disposed in the branch pipe, and a first flow rate calculation section to calculate a first flow rate on the basis of output of the pair of winding resistances.

In another embodiment of the present invention, a flow rate control apparatus includes a valve, a flow rate sensor, a first pressure sensor, a characteristic map storage section, a second flow rate calculation section, a state determination section, and a valve control section. The valve is provided with a position sensor to measure an opening degree, and is disposed in a flow channel that permits passage of a fluid. The flow rate sensor is disposed downstream of the valve and provided with a fluid resistance element. The flow rate sensor is designed to output a first flow rate. The first pressure sensor is disposed downstream of the fluid resistance element, and is disposed upstream of the valve. The characteristic map storage section is designed to store a characteristic map indicating a relationship between at least an opening degree of the valve, a differential pressure before and after the valve, and a flow rate of a fluid passing through the flow channel. The second flow rate calculation section is designed to calculate a second flow rate from the characteristic map on the basis of a measured opening degree being measured by the position sensor, and a first pressure being measured by the first pressure sensor. The state determination section is designed to determine whether a flow rate of a fluid passing through the flow channel is in a stable state or a transient state. The valve control section is designed to control the valve so that the flow rate of the fluid passing through the flow channel reaches an accepted target flow rate. When the state determination section determines as being in a stable state, the valve control section is designed to control an opening degree of the valve on the basis of the target flow rate and the first flow rate outputted from the flow rate sensor. When the state determination section determines as being in a transient state, the valve control section is designed to control an opening degree of the valve on the basis of the target flow rate and a second flow rate calculated by the second flow rate calculation section. The flow rate sensor further includes a high resistance flow channel provided with the fluid resistance element, a low resistance flow channel which is disposed in parallel to the high resistance flow channel, and is joined through a terminal end to the high resistance flow channel, and a switching valve to perform switching between the high resistance flow channel and the low resistance flow channel so that a fluid passes through one of the flow channels. When the state determination section determines as being in a transient state, the switching valve is designed to permit passage of a fluid into the low resistance flow channel.

According to the above embodiment, it can be designed so that the fluid after passing through the valve does not pass through the fluid resistance element in the transient state, such as when a target flow rate rises or falls. It is therefore possible to increase response speed without the likelihood that a flow is obstructed by the fluid resistance element and the flow remains undelivered.

In still another embodiment of the present invention, a flow rate control apparatus may be designed to enhance the response speed by immediately changing from an opening degree in the transient state to an opening degree in the stable state, through control to ensure that a target opening degree of the valve that needs to be set from the differential pressure before and after the valve, and a target flow rate, and the target opening degree is identical with a measured opening degree indicated by the position sensor disposed in the valve, without including the state determination section and the second flow rate calculation section. The flow rate control apparatus includes a valve, a flow rate sensor, a first pressure sensor, a second pressure sensor, a characteristic map storage section, and an opening degree control section. The valve is provided with a position sensor to measure an opening degree and disposed in a flow channel that permits passage of a fluid. The flow rate sensor is disposed upstream of the valve and provided with a fluid resistance element. The first pressure sensor is disposed downstream of the fluid resistance element and disposed upstream of the valve. The second pressure sensor is disposed downstream of the valve. The characteristic map storage section is designed to store a characteristic map indicating a relationship between at least an opening degree of the valve, a differential pressure before and after the valve, and a flow rate of a fluid passing through the flow channel. The opening degree control section is designed to control an opening degree of the valve so that a flow rate of a fluid passing through the flow channel reaches an accepted target flow rate. When a target flow rate is in a transient state, the opening degree control section determines a target opening degree from the characteristic map on the basis of a target flow rate being accepted and a first pressure being measured by the first pressure sensor. The opening degree control section controls an opening degree of the valve so that a measured opening degree measured by the position sensor reaches the target opening degree.

In an embodiment of the present invention, a program recording medium having recorded therein a program for a flow rate control apparatus may be designed to increase response speed by being changed to an opening degree necessary for obtaining a target flow rate in a short time even in a transient state in an existing flow rate control apparatus as in the case with the present invention, the program recording medium may be designed to install the program on the existing flow rate control apparatus. The flow rate control apparatus includes a valve, a flow rate sensor, and a first pressure sensor. The valve is provided with a position sensor to measure an opening degree and disposed in a flow channel that permits passage of a fluid. The flow rate sensor is disposed upstream of the valve and provided with a fluid resistance element. The flow rate sensor is designed to output a first flow rate. The first pressure sensor is disposed downstream of the fluid resistance element and disposed upstream of the valve. The program recording medium causes a computer to function as: a characteristic map storage section to store a characteristic map indicating a relationship between at least an opening degree of the valve, a differential pressure before and after the valve, and a flow rate of a fluid passing through the flow channel; a second flow rate calculation section to calculate a second flow rate from the characteristic map on the basis of a measured opening degree being measured by the position sensor, and a first pressure being measured by the first pressure sensor; a state determination section to determine whether a flow rate of a fluid passing through the flow channel is in a stable state or a transient state; and a valve control section to control the valve so that a flow rate of a fluid passing through the flow channel reaches an accepted target flow rate. When the state determination section determines as being in a stable state, the valve control section is designed to control an opening degree of the valve on the basis of the target flow rate and the first flow rate outputted from the flow rate sensor. When the state determination section determines as being in a transient state, the valve control section is designed to control an opening degree of the valve on the basis of the target flow rate and a second flow rate calculated by the second flow rate calculation section on the basis of a measured opening degree being measured by the position sensor. Alternatively, the program for the flow rate control apparatus may be one which is electronically distributed, or one which is stored in a program recording medium, such as a CD, DVD, HDD, and flush memory.

Effects of the Invention

Thus, with the flow rate control apparatus according to the present invention, it is possible to ensure that the fluid passing through the valve does not pass through the fluid resistance element in the transient state, such as when the target flow rate rises or falls, and the opening degree of the valve is immediately changeable to a target opening degree by control of the valve with the second flow rate having a high response speed. It is therefore possible to make the flow rate of the fluid follow up a target value at high speed even when the target flow rate rises or falls.

DESCRIPTION OF THE EMBODIMENTS

The flow rate control apparatus according to a first embodiment of the present invention is described below with reference to FIGS. 1 to 4.

Figure 4:
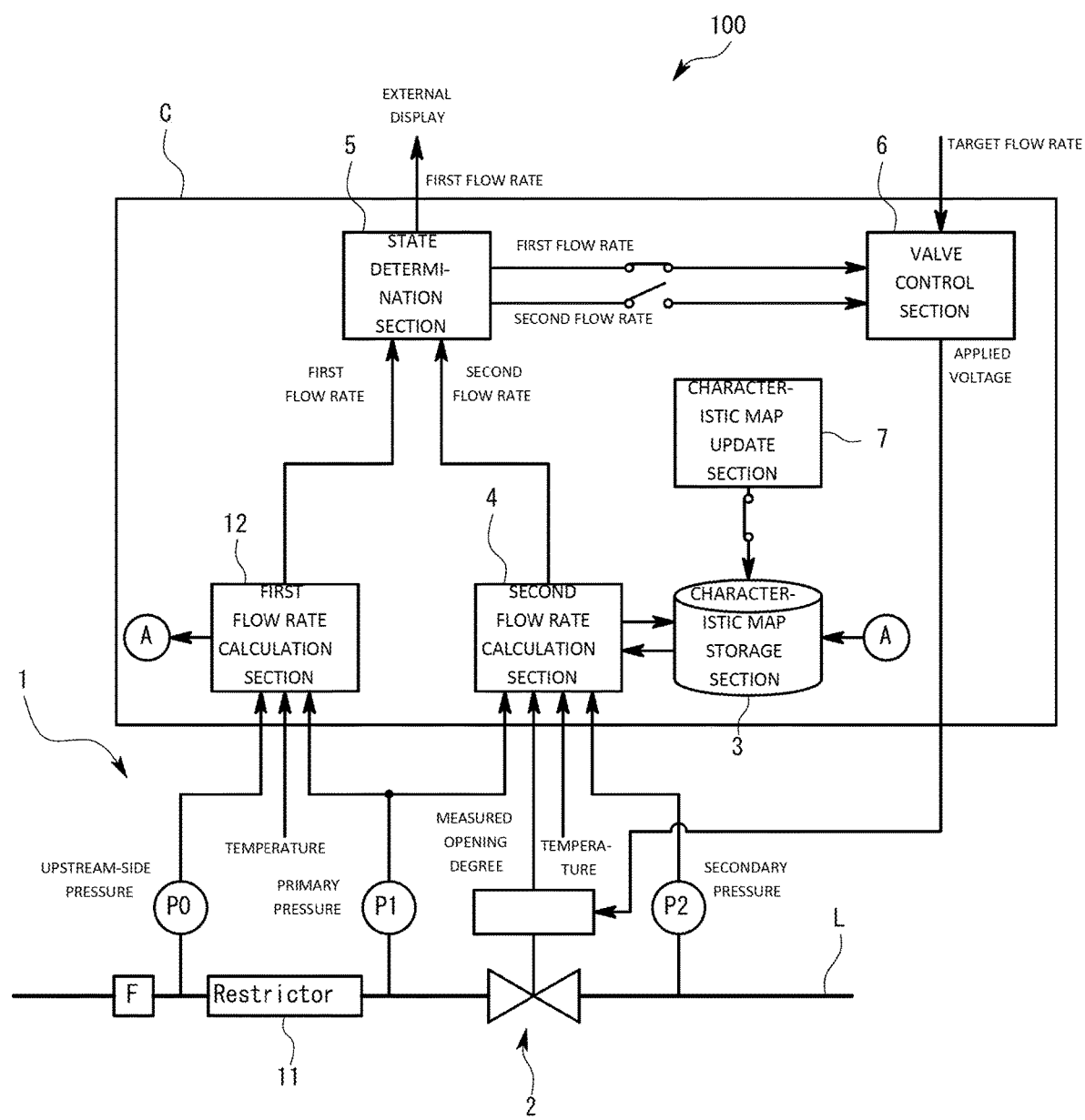
FIG. 4 is a schematic diagram showing a control mode in a stable state in the flow rate control apparatus of the first embodiment.

The flow rate control apparatus of the first embodiment is used for passing a component gas into a chamber at a target flow rate in a semiconductor manufacturing process. For example, a step function is inputted as a target flow rate in a mass flow controller 100. Specifically, the target flow rate includes a rising at which a flow rate increases by a predetermined value or more within a predetermined period of time, a constant flow rate period in which a flow rate is kept at a predetermined value over a long period, and a falling at which the flow rate decreases by a predetermined value or more within the predetermined period of time. The mass flow controller 100 is obtainable by integrally packaging fluid control units and a control board C to manage calculation and control on the basis of output of the individual fluid control units. The mass flow controller 100 applies different flow rate control modes to a transient state and a stable state as shown in FIGS. 1 and 4.

Figure 1:
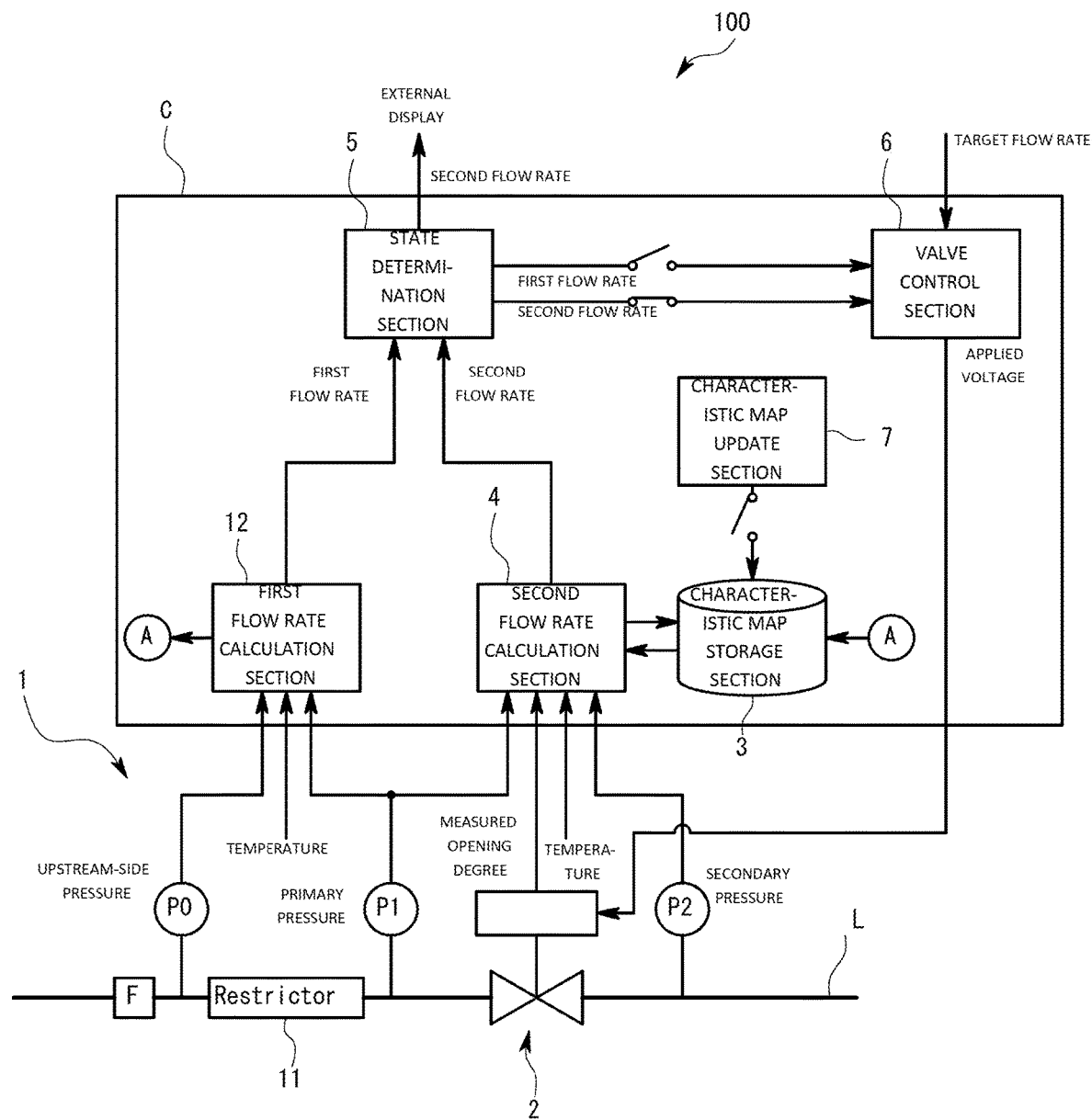
FIG. 1 is a schematic diagram showing a control mode in a transition state in a flow rate control apparatus according to a first embodiment of the present invention.

As shown in FIG. 1, the mass flow controller 100 includes, as the fluid control unit, an internal flow channel L formed in a block body (not shown), a filter F, a flow rate sensor 1, a valve 2, and a second pressure sensor P2, which are disposed with respect to the internal flow channel L.

These components are described below.

The filter F is disposed on the most upstream side for the purpose of preventing dust or the like in a fluid from entering the chamber.

The flow rate sensor 1 is a pressure type one and disposed upstream of the valve 2. The flow rate sensor 1 includes an upstream-side pressure sensor P0, a restrictor 11 as a fluid resistance element, and a first pressure sensor P1 which are disposed in this order from the upstream side. The first pressure sensor P1 is used for calculating a flow rate from a differential pressure before and after the restrictor 11, and is also used for measuring a differential pressure before and after the valve 2. That is, the first pressure sensor P1 disposed between the restrictor 11 and the valve 2 is used in common for achieving two purposes of measurement, so that the number of installed pressure sensors is decreased by one. The flow rate sensor 1 further includes a first flow rate calculation section 12 configured by an operation function in the control mode. The first flow rate calculation section 12 performs conversion into a flow rate on the basis of pressures respectively measured by the upstream-side pressure sensor P0 and the first pressure sensor P1.

Figure 2:
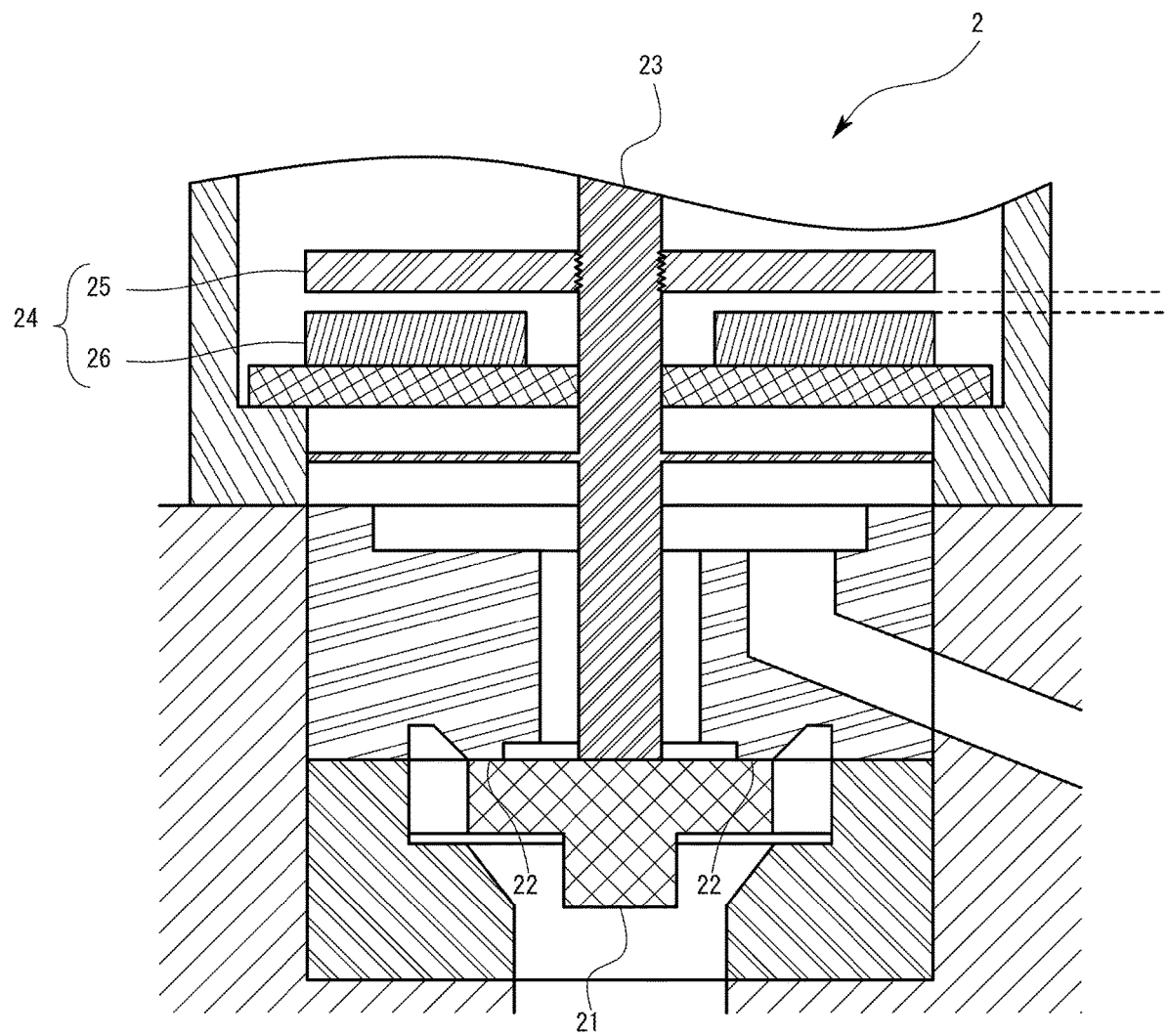
FIG. 2 is a schematic diagram showing a structure of a valve in the flow rate control apparatus of the first embodiment.

The valve 2 has built therein a position sensor 24 for measuring an opening degree as shown in FIG. 2. The position sensor 24 is designed to indirectly measure displacement of a valve body 21 relative to a valve seat 22 from displacement of a plunger 23 for moving the valve body 21. The position sensor 24 includes a metal target 25 secured to the plunger 23, and a sensor body 26 opposed to the target 25. The position sensor 24 detects, through the sensor body 26, a change in electrostatic capacity caused due to a change in separation distance between the target 25 and the sensor body 26, and converts the change in electrostatic capacity into an opening degree. The position sensor 24 is not limited to an electrostatic capacitive displacement sensor, and it may alternatively be an eddy current displacement sensor, or one which directly measures the valve body 21. Still alternatively, the position sensor 24 may be one which measures displacement of, for example, a piezo actuator for driving the plunger 23.

The second pressure sensor P2 is disposed downstream of the valve 2. The upstream-side pressure sensor P0, the first pressure sensor P1, and the second pressure sensor P2 are of the same type. Alternatively these pressure sensors P0, P1, and P2 may be of different types.

The control board C is a computer including, for example, a CPU, memory, an AD/DA convertor, input/output means, and a display. The control board C is designed to function as the first flow rate calculation section 12, a characteristic map storage section 3, a second flow rate calculation part 4, a state determination section 5, a valve control section 6, and a map update section 7 by execution of a program for the flow rate control apparatus being stored in a predetermined region of the memory so as to cooperate with a variety of devices. Each of the components other than the first flow rate calculation section 12 described above is described in detail below.

Figure 3:
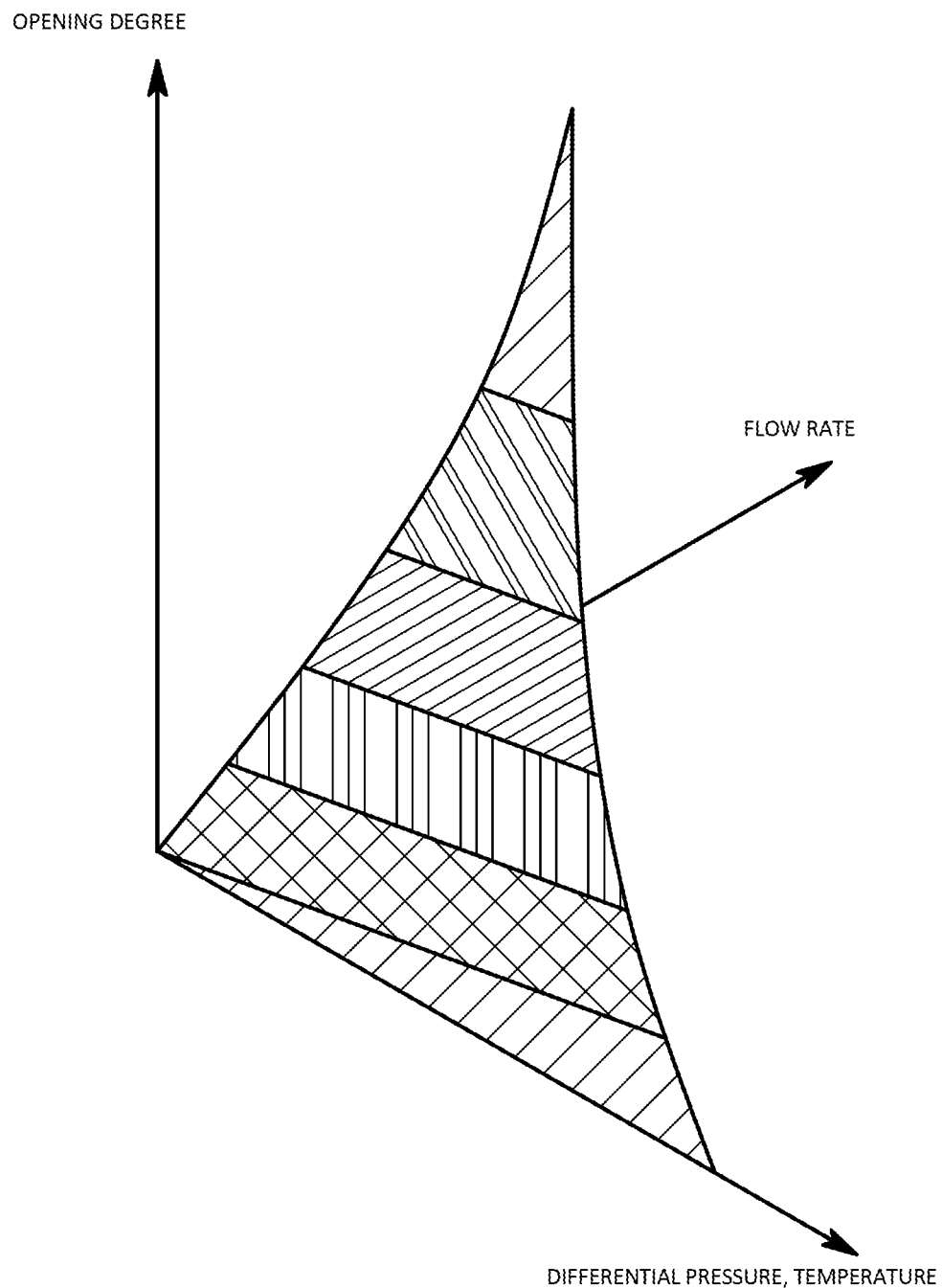
FIG. 3 is a schematic diagram showing an exemplary characteristic map in the flow rate control apparatus of the first embodiment.

The characteristic map storage section 3 is designed to store a characteristic map indicating relationships among the opening degree of the valve 2, the differential pressure before and after the valve 2, the temperature of the fluid, and the flow rate of the fluid passing through the flow channel L. It can be rephrased as a function whose input variables are the differential pressure, the temperature, and the opening degree and whose output variable is the flow rate. The characteristic map is created on the basis of actual measurement data by, for example, a factory acceptance test. More specifically, a first pressure and a second pressure respectively measured by the first pressure sensor P1 and the second pressure sensor P2 when the valve 2 is set to a certain opening degree, the temperature of the fluid, and a measuring flow rate measured by the flow rate sensor 1 are stored in pairs. As shown in FIG. 3, it is designed to actually measure a predetermined number of points within an operating range, and actual measurement data are designed to be calculated by interpolation.

The second flow rate calculation section 4 calculates a second flow rate from the characteristic map on the basis of a measured opening degree being measured by the position sensor 24, the first pressure being measured by the first pressure sensor P1, and the second pressure being measured by the second pressure sensor P2 at the present moment. That is, a corresponding second flow rate is obtainable by reading the characteristic map from the characteristic map storage section 3, and inputting the present opening degree, the present first pressure, and the present second pressure to the function. The second flow rate calculation section 4 is designed to keep on calculating a flow rate all the time together with the flow rate sensor 1. The second flow rate calculated by the second flow rate calculation section 4 is calculated without using a pressure drop due to the restrictor 11. Therefore, the second flow rate has smaller time delay than the flow rate sensor 1, and is capable of substantially simultaneously indicating an actual flow rate of the fluid passing through the valve 2.

The state determination section 5 determines whether the state of the fluid passing through the flow channel L is in a stable state or a transition state on the basis of the first flow rate outputted from the flow rate sensor 1, or the second flow rate calculated by the second flow rate calculation section 2. The term "stable state" denotes a state in which the flow rate of the fluid passing through the flow channel L is kept at an approximately constant flow rate. The term "transient state" denotes a state in which the flow rate of the fluid passing through the flow channel L changes by a predetermined value or more. The state determination section 5 changes a control mode for the mass flow controller 100 according to a determination result as shown in FIGS. 1 and 4. During the time that a determination is made that it is not the stable state, namely, during the time that the state determination section 5 determines that it is the transient state, the second flow rate having a high response speed obtainable by referring to the characteristic map is inputted to the valve control section 6 as shown in FIG. 1. For example, during the time that the state determination section 5 determines that it is the transient state, the second flow rate is outputted to the outside as the present flow rate value, and is then displayed on a display. Thus, the mass flow controller 100 executes the flow rate control mode on the basis of the output of the position sensor 24 in the transient state.

When a determination is made that it is the stable state, the state determination section 5 inputs the first flow rate, which is outputted from the flow rate sensor 1, to the valve control section 6 and the map upstate section 7 as shown in FIG. 4. During the time that a determination is made that it is the stable state, the state determination section 5 outputs, for example, the first flow rate as the present flow rate to the outside, and is then displayed on the display. Thus, the mas flow controller 100 executes the flow rate control mode in the stable state, on the basis of the first flow rate calculated from the differential pressure generated in the restrictor 11.

It is designed to determine whether the flow rate of the fluid passing through the flow channel L is the transient state or the stable state, depending on whether, in a state in which a certain target flow rate is inputted, a measuring flow rate follows up or not within a predetermined error range for a certain period of time. For example, when the first flow rate or the second flow rate follows up with an error within, for example, 5% with respect to a certain target flow rate in a predetermined time, a determination is made that it is the stable state. In contrast, when there occurs an error of 5% or more, a determination is made that it is the transient state. Alternatively, it may be designed so that the state determination section 5 determines as being in the stable state when the first flow rate or the second flow rate follows up for a predetermined time with respect to the certain target flow rate with an error within 2% as a severer criteria. Still alternatively, the state determination section 5 may be designed to determine that it is the transient state, for example, for a predetermined time from a time point at which a discontinuity point exists in a target flow rate, and determine that it is the stable state after the passage of the predetermined time, instead of using the first flow rate or the second flow rate as a criteria for determination.

The valve control section 6 is designed to operate differently between the transient state and the stable state as shown in FIGS. 1 and 4. In the control mode in the transient state shown in FIG. 1, the valve control section 6 is designed to perform opening degree control on the basis of the second flow rate obtainable by referring to the characteristic map. That is, when the target flow rate rises, or when the target flow rate falls into the transient state, the valve control section 6 performs feedback control of an applied voltage to the valve 2 on the basis of the a target flow rate being accepted and the second flow rate. In other words, even though the first flow rate is already calculated, the first flow rate enters a state of not being used for the opening degree control of the valve 2 in the transient state.

In the control mode in the stable state as shown in FIG. 4, the first flow rate to be measured by the flow rate sensor 1 is fed back to the valve control section 6, and feedback control of the applied voltage is carried out on the basis of the target flow rate and the first flow rate. In other words, even though the second flow rate is already calculated, the second flow rate enters a state of not being used for the opening degree control of the valve 2.

The characteristic map update section 7 updates the characteristic map on the basis of the first flow rate, the first pressure, the second pressure, the temperature, and the opening degree which are already measured in the control mode in the stable state shown in FIG. 4. For example, the characteristic map update section 7 causes the first pressure, the second pressure, and the temperature to be sequentially stored in a temporary memory of the characteristic map storage section 3 at individual times being inputted to the first flow rate calculation section 12, and then updates their respective values as a characteristic map value when the first flow rate is being inputted to the characteristic map update section 7 in the stable state. That is, one point of quantity of state, which is already achieved in the control mode in the stable state, is replaced in the characteristic map in FIG. 3.

With the mass flow controller 100 of the first embodiment so designed, the flow rate sensor 1 having the restrictor 11 disposed upstream of the valve 2. Therefore, even when the target flow rate falls, the flow of the fluid after passing through the valve 2 is not obstructed by the restrictor 11. That is, the flow rate of the fluid can be decreased as soon as the opening degree of the valve 2 is decreased.

In the control mode in the transient state, instead of the first flow rate, the second flow rate is used to control the valve 2. The first flow rate involves time delay when a flow rate changes because the first flow rate is calculated on the basis of the pressures before and after the restrictor 11. The second flow rate is calculated on the basis of the measured opening degree obtained by the position sensor 24, the differential pressure before and after the valve 2, the temperature, and the characteristic map. The second flow rate is therefore is less subjected to time delay relative to a flow rate that is actually changing. Therefore, even when a target flow rate changes considerably, it is possible to promptly change to an opening degree at which the target flow rate is achievable.

These contribute to obtaining the target flow rate in a short time even at the falling. This is also approximately true at the rising, and it is therefore possible to improve the response speed of the flow rate control in the transient state than conventional ones.

Additionally, because the characteristic map is sequentially updated by the characteristic map update section 7, the target flow rate is accurately achievable all the time, for example, even when hysteresis exists between the applied voltage and the opening degree of the valve 2, thus being susceptible to changes with time. That is, reproducibility of flow rate control can be ensured over a long period of time even with the valve control on the basis of the output from the position sensor 24.

A mass flow controller 100 according to a second embodiment of the present invention is described below with reference to FIGS. 5 and 6.

Figure 5:
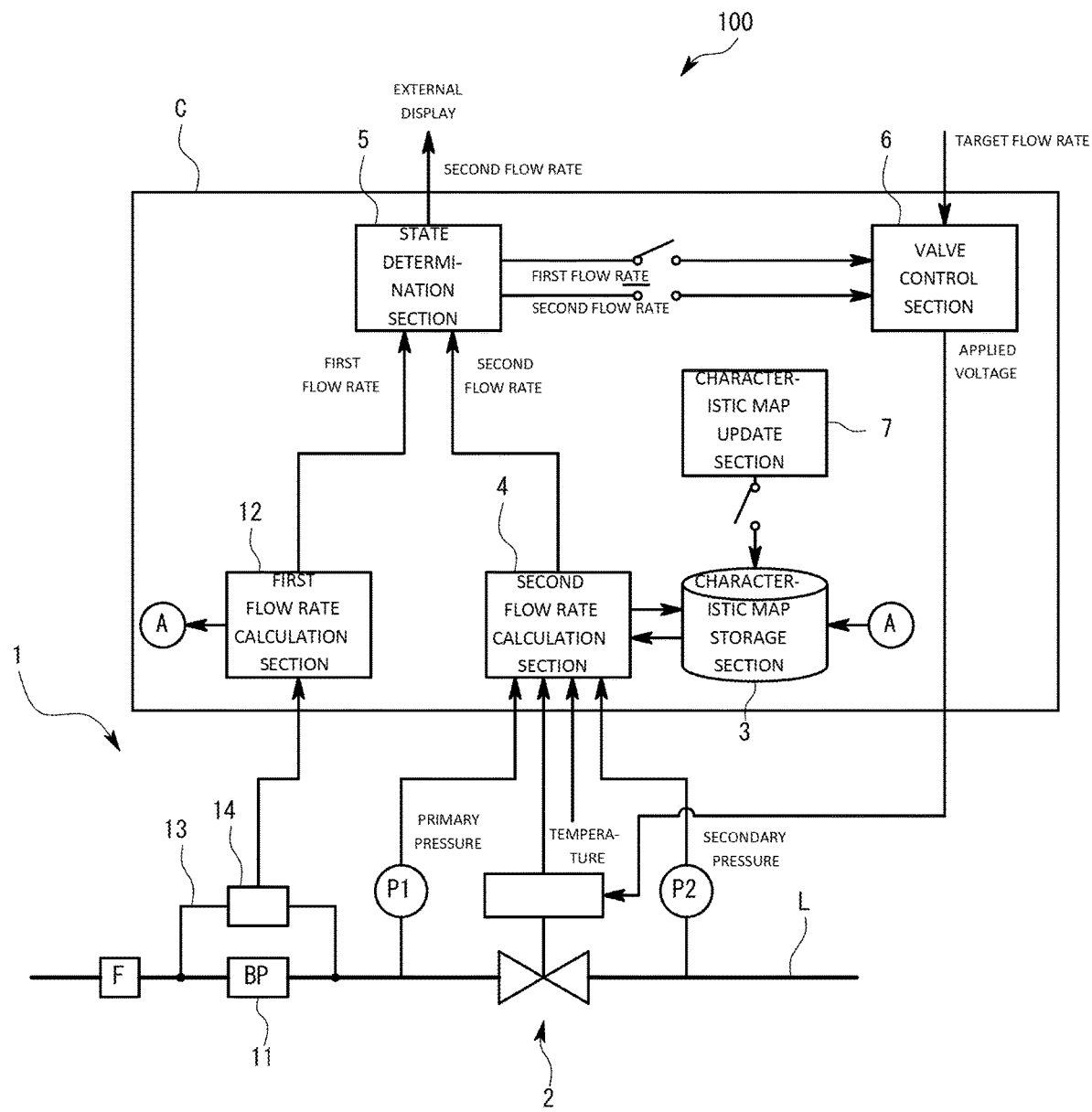
FIG. 5 is a schematic diagram showing a control mode in a stable state in a flow rate control apparatus according to a second embodiment of the present invention.
Figure 6:
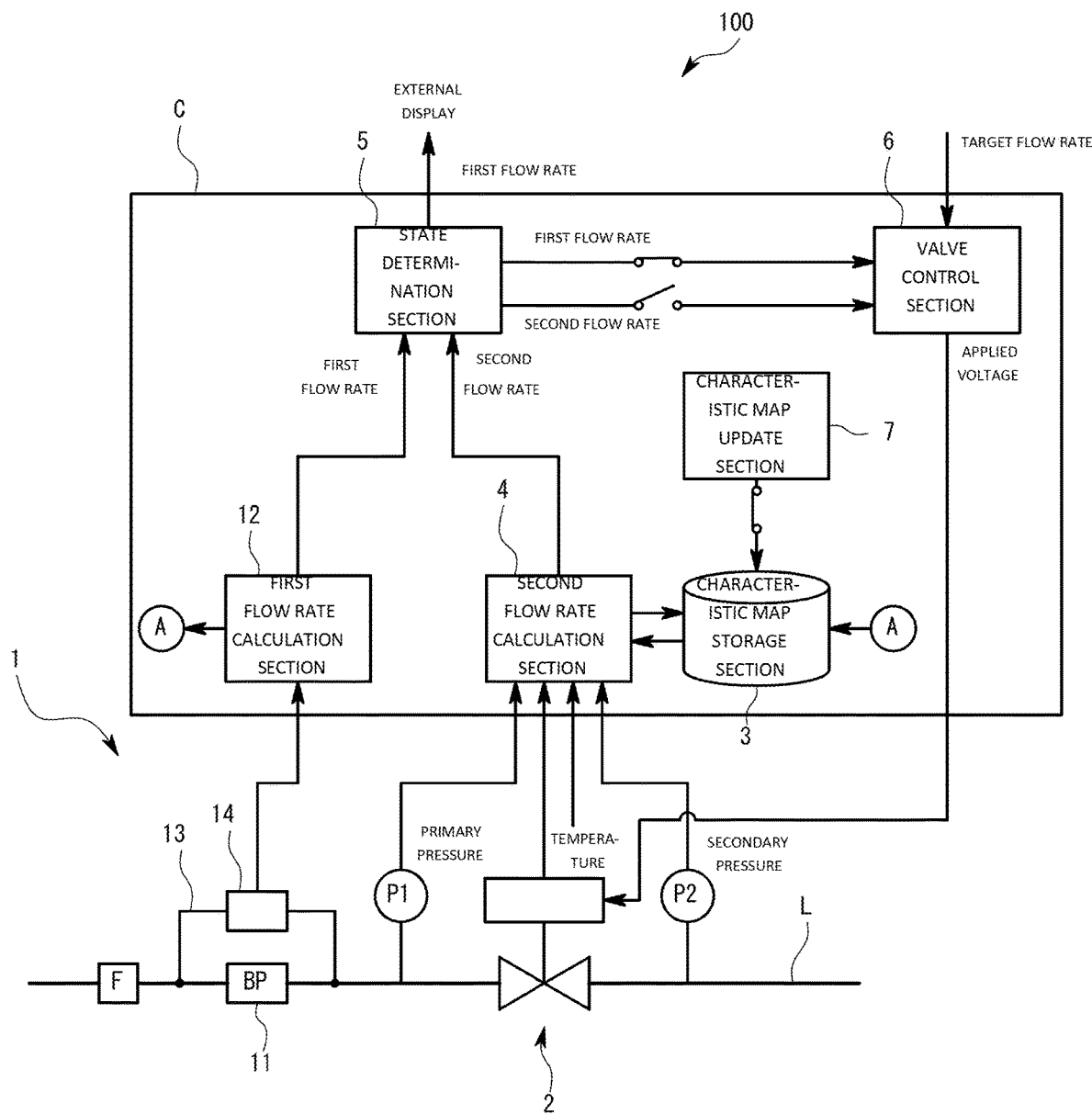
FIG. 6 is a schematic diagram showing a control mode in a stable state in the flow rate control apparatus of the second embodiment.

As shown in FIGS. 5 and 6, the mass flow controller 100 of the second embodiment differs from that of the first embodiment in that a thermal type flow rate sensor 1 is used instead of the pressure type flow rate sensor 1. The thermal type flow rate sensor 1 is also disposed upstream of the valve 2 so that a shunting element 11, which is a fluid resistance element included in the thermal type flow rate sensor 1, is disposed upstream of the valve 2. As shown in functional blocks in FIGS. 5 and 6, the configuration of the control mode in the transient state, the configuration of the control mode in the stable state, and the operations remain the same.

The thermal type flow rate sensor 1 is described in detail below. The flow rate sensor 1 includes a branch pipe 13, a pair of winding resistances 14, and a first flow rate calculation section 12. The branch pipe 13 is branched from an upstream side of the shunting element 11, and is joined at a downstream side of the shunting element 11. The winding resistances 14 are disposed in the branch pipe 13. The first flow rate calculation section 12 calculates a flow rate on the basis of output of the pair of winding resistances. Because the thermal type flow rate sensor 1 includes no pressure sensor, a first pressure sensor P1 is disposed between the thermal type flow rate sensor 1 and the valve 2 in order to measure a differential pressure before and after the valve 2.

The branch pipe 13 is a slender metal pipe whose outside is provided with the pair of winding resistances 14 functioning as a temperature sensor and a heater. Individual applied voltages are controlled so as to keep temperatures of the winding resistances 14 constant, and the first flow rate calculation section 12 calculates a flow rate on the basis of voltages at that time. Alternatively, the first flow rate calculation section 12 may be designed to calculate a flow rate on the basis of a difference in temperature between the winding resistances 14 while keeping the applied voltage constant.

The mass flow controller 100 of the second embodiment produces similar effects to those produced by the first embodiment. That is, because the valve 2 is disposed downstream of the shunting element 11 included in the thermal type flow rate sensor 1, the shunting element 11 does not obstruct the flow of a fluid passing through the valve 2 even during the time that a target flow rate changes stepwise and the flow rate enters the transient state. In the transient state, a second flow rate calculated by referring to a characteristic map on the basis of a measured opening degree obtained by a position sensor 24, a first pressure, a second pressure, and a temperature is fed back as shown in FIG. 5, and a valve control section 6 performs opening degree control of the valve 2, so that time delay is less likely to occur. Owing to these, an actual flow rate of the fluid passing through the valve 2 can be followed up in a short time with respect to a stepwise change in a target flow rate.

Under the control in the stable state, the control of the valve 2 is carried out on the basis of a first flow rate measured by the thermal type flow rate sensor 1 as shown in FIG. 6, and the characteristic map is updated by the first flow rate measured by the flow rate sensor 1, a first pressure, a second pressure, and a temperature, each of which is obtained at that time. It is therefore possible to ensure accuracy of the second flow rate over a long period of time even when hysteresis occurs in the valve 2. Even when an error occurs due to a factor other than the hysteresis, an accurate second flow rate is calculable by update of the characteristic map.

Figure 7:
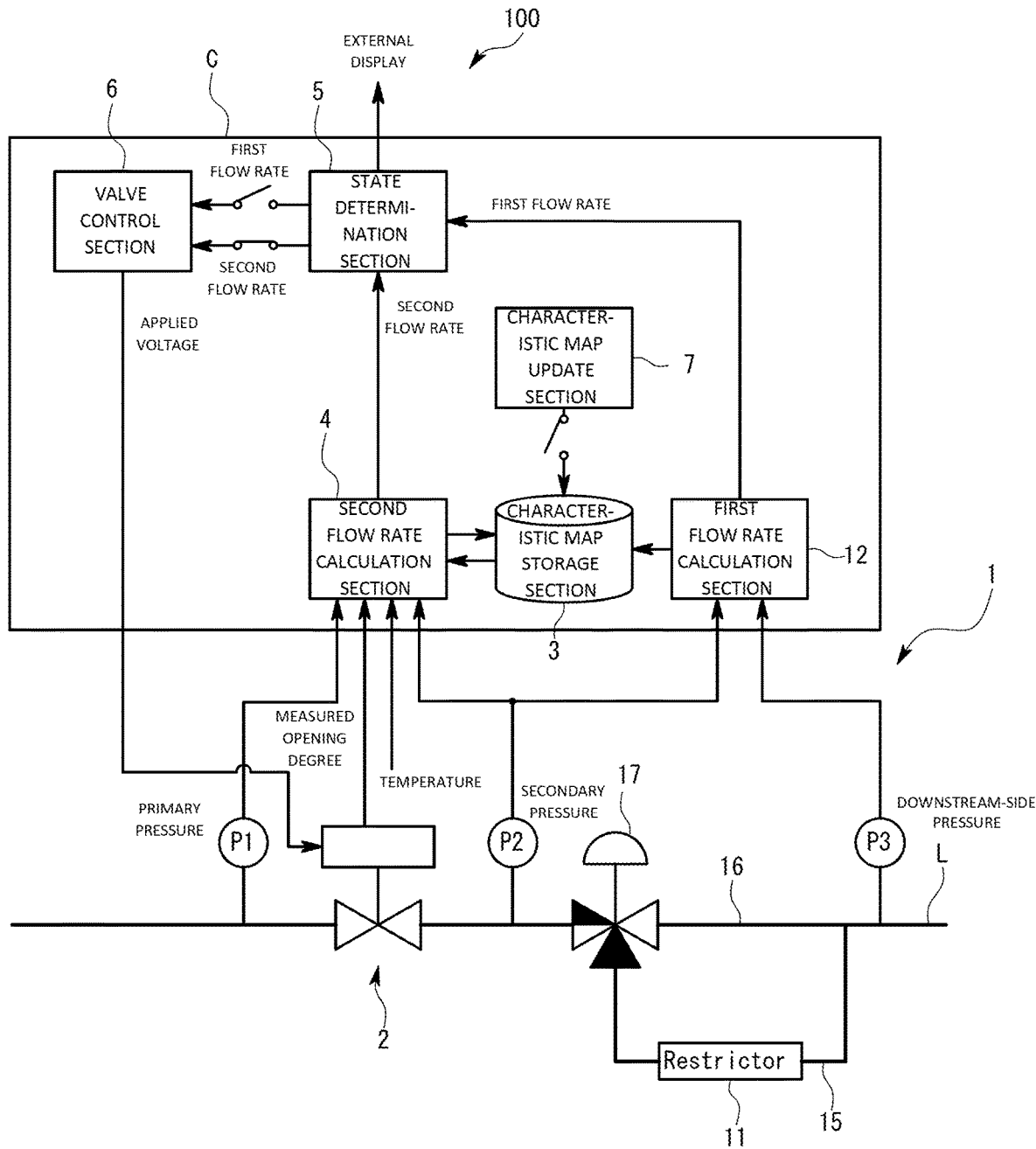
FIG. 7 is a schematic diagram showing a control mode in a transient state of a flow rate control apparatus according to a third embodiment of the present invention.
Figure 8:
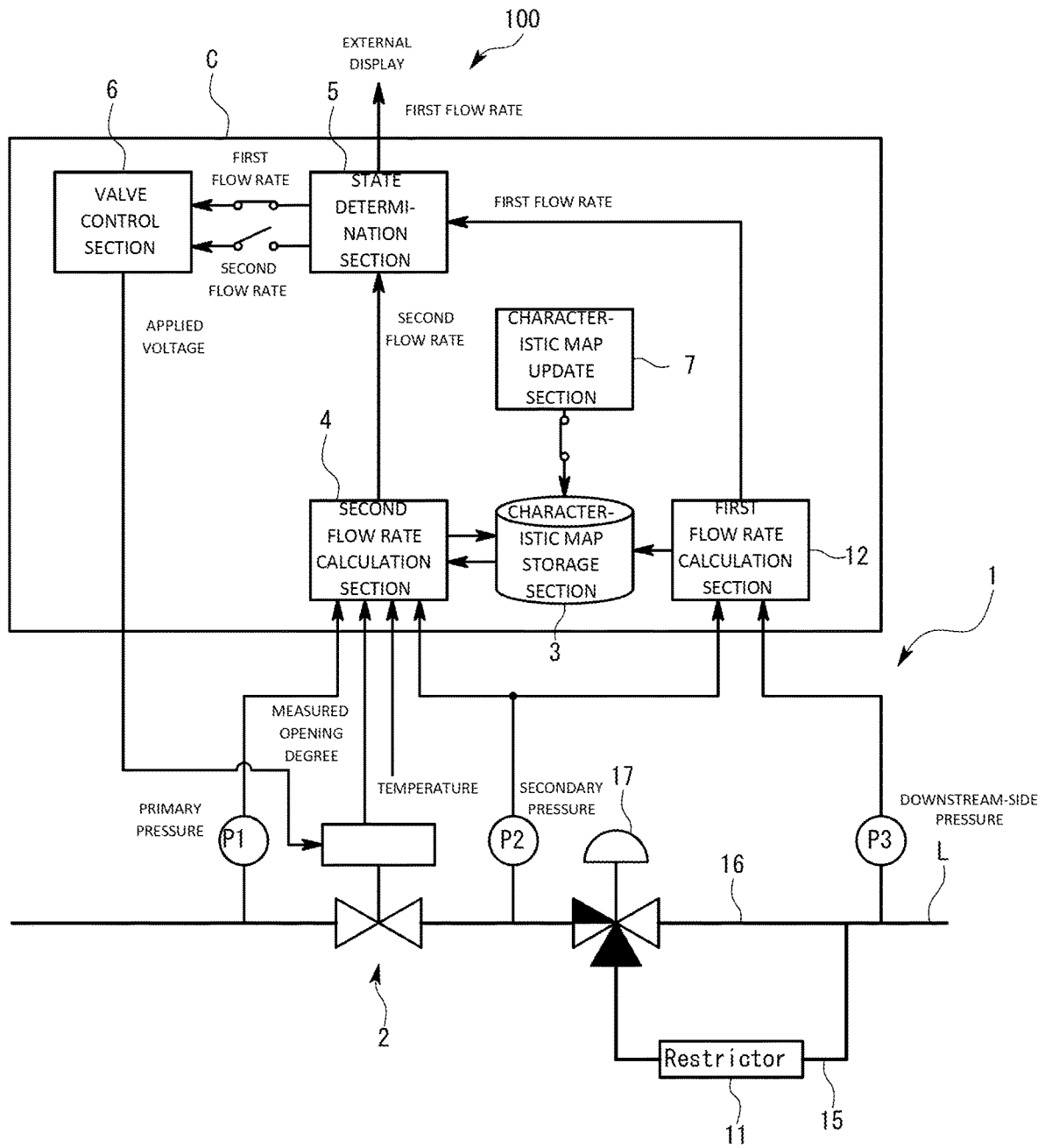
FIG. 8 is a schematic diagram showing a control mode in a stable state in the flow rate control apparatus of the third embodiment.

A mass flow controller 100 according to a third embodiment of the present invention is described below with reference to FIGS. 7 and 8. The mass flow controller 100 of the third embodiment differs from that of the first embodiment in layout and configuration of the pressure type flow rate sensor 1 with respect to the valve 2.

More specifically, the pressure type flow rate sensor 1 is disposed downstream of the valve 2. Further in the flow rate sensor 1, only one of a high resistance flow channel 15 provided with a restrictor 11 and a low resistance flow channel 16 made up only of a hollow pipe not provided with the restrictor 11 is designed to permit passage of a fluid in the flow rate sensor 1. That is, the flow rate sensor 1 of the third embodiment includes a second pressure sensor P2, a three-way valve 17, the high resistance flow channel 15 and the low resistance flow channel 16, and a downstream-side pressure sensor P3. The second pressure sensor P2 is disposed downstream of the valve 2. The three-way valve 17 is a switching valve disposed downstream of the second pressure sensor P2. The high resistance flow channel 15 and the low resistance flow channel 16 are respectively coupled to two outlets of the three-way valve 17. The downstream-side pressure sensor P3 is disposed downstream of a point at which the high resistance flow channel 15 joins the low resistance flow channel 16. With the flow rate sensor 1, switching of the three-way valve is carried out so that the fluid is passed into the low resistance flow channel 16 as shown in FIG. 7 in a control mode when a state determination section 6 determines as being in a transient state, and so that the fluid is passed into the high resistance flow channel 15 as shown in FIG. 8 in a control mode when the state determination section 6 determines as being in a stable state. Therefore, the flow rate sensor 1 becomes capable of measuring the flow rate only when the fluid passes into the high resistance flow channel 15 and a differential pressure occurs by operation of the restrictor 11. In this case, the first flow rate calculation section 12 calculates a measuring flow rate on the basis of a second pressured measured by the second pressure sensor P2, and a downstream-side pressure measured by the downstream-side pressure sensor P3.

In the transient state, it is designed so as not to obstruct the flow of the fluid passing through the restrictor 11 toward downstream by passing the fluid into the low resistance flow channel 16. Thus, a response speed of flow rate control in the transient state is improved. The first flow rate calculation section 12 is not capable of calculating a flow rate because no differential pressure occurs during the time that the fluid passes into the low resistance flow channel 16. Opening degree control of the valve 2 by the valve control section 7 is carried out on the basis of a second flow rate obtainable from the present measured opening degree, the present first pressure, the present second pressure, and the present temperature, each of which is inputted into the characteristic map being stored in the character map storage section 3 by the second flow rate calculation section 4. As shown in functional block diagrams of FIGS. 7 and 8, other control embodiment is similar to that of the first embodiment.

With the mass flow controller 100 of the third embodiment, even when the flow rate sensor 1 is disposed downstream of the valve 2, the response speed of the flow rate control is improvable by causing the fluid to flow while detouring the restrictor 11 when a target flow rate falls. The control of the valve 2 can be continued with the second flow rate calculated from the characteristic map on the basis of a differential pressure before and after the valve 2, a temperature, and a measured opening degree during the transient state in which it is not possible to calculate a flow rate using a differential pressure in the restrictor 11. In the stable state, the characteristic map is updated on the basis of the first flow rate measured by the flow rate sensor 1, and the measured opening degree, the second pressure, and the downstream-side pressure which are characteristic parameters at that time. Therefore, the characteristic map is properly correctable even when the characteristic map is changed due to the hysteresis of the valve 2. This makes it possible to ensure the accuracy of the second flow rate calculated on the basis of the measured opening degree over a long period of time.

Figure 9:
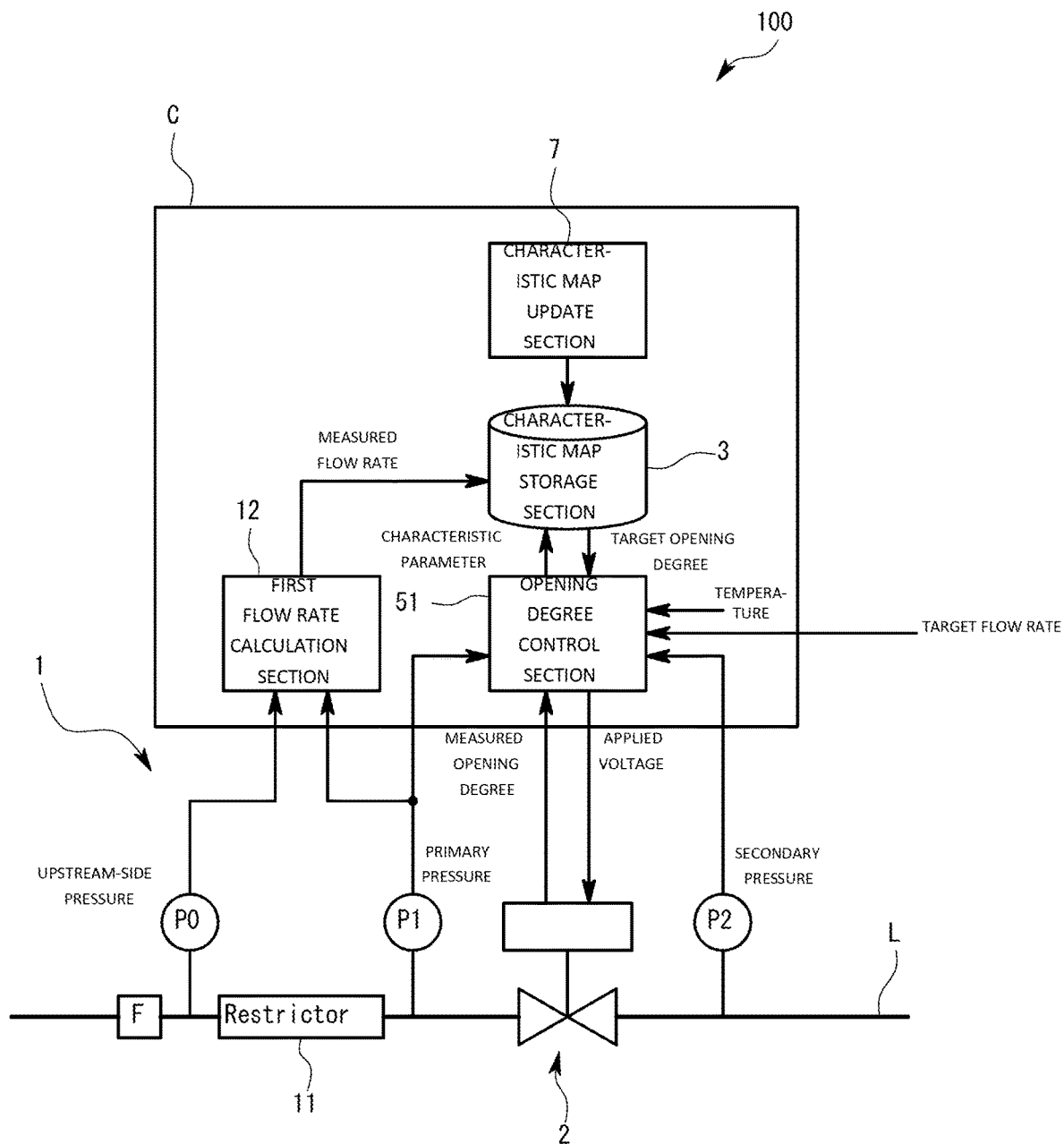
FIG. 9 is a schematic diagram showing a flow rate control apparatus according to a fourth embodiment of the present invention.

A mass flow controller 100 according to a fourth embodiment is described below with reference to FIG. 9. The mass flow controller 100 of the fourth embodiment is designed to perform control so that a measured opening degree measured by a position sensor 24 reaches an acquired opening degree by referring to a characteristic map being stored in a characteristic map storage section 3 on the basis of a differential pressure before and a valve 2 and an ultimate target flow rate in a transient state in which a target flow rate is changing, and by acquiring an opening degree of the valve 2 which needs to be achieved. Specifically, the mass flow controller 100 of the fourth embodiment includes an opening degree control section 51 instead of the valve control section 5 of the foregoing embodiments. The opening degree control section 51 determines a corresponding target opening degree from the characteristic map on the basis of a target flow rate being accepted, a first pressure being measured by a first pressure sensor P1, and a second pressure being measured by a second pressure sensor P2. The target opening degree is the same as an opening degree that has been achieved by the valve 2 when the target flow rate has been achieved in a state in which a differential pressure between a first pressure and a second pressure occurs before and after the valve 2 in a fluid passing through a flow channel L in past control performance.

The opening degree control section 51 controls the opening degree of the valve 2 by changing an applied voltage to the valve 2 so that a measured opening degree measured by the position sensor 24 reaches the target opening degree obtainable from the characteristic map. The opening degree control section 51 performs, from start, feed-forward control of an actual opening degree into the target opening degree that needs to be achieved, instead of feedback control on the basis of a deviation between a measured flow rate and a target flow rate. This leads to an extremely high response speed.

Other embodiments are described below.

The flow rate control apparatus needs to be designed so that the control mode in the transient state is carried out at least when a target flow rate falls. That is, when the target flow rate rises, it may be designed to perform control under which the first flow rate measured by the flow rate sensor is fed back, as in the case in the control mode in the stable state.

As to the individual functional blocks enabled by using the functions of the computer, their respective functions are designed to be enabled by the single control board in the foregoing embodiments. For example, the flow rate calculation section may be designed so that the function thereof is enabled by another control board. Alternatively, the functions of the individual functional blocks may be enabled by an external personal computer or the like.

The valve may be controlled with the second flow rate obtainable from the characteristic map without carrying out the flow rate feedback even in the control mode in the stable state. In this case, the first flow rate measured by the flow rate sensor needs to be used only for updating the characteristic map.

A restrictor having a smaller resistance than the restrictor disposed in the high resistance flow channel may be disposed inside the lower resistance flow channel. This makes it possible to calculate a flow rate by using a differential pressure even when a fluid is passed through the low resistance flow channel, while improving response characteristic at the falling than conventional ones. The switching valve is not limited to the three-way valve, and any other valve may be used.

For example, when a downstream side of the flow channel is coupled to an MOCVD or a chamber and a downstream side of the valve is kept approximately constant at vacuum pressure or the like, the second pressure sensor may be omitted while assuming that the second pressure is kept at approximately the same pressure as that in the chamber, and a differential pressure with the first pressure may be calculated, followed by a reference to the characteristic map. When a supply pressure from a cylinder as a supply source of a fluid passing through the flow channel is kept approximately constant, the upstream-side pressure sensor may be omitted while assuming that the pressure at the upstream side of the fluid resistance element is kept at approximately the same pressure as the supply pressure, and the flow rate sensor may be designed to output a measured flow rate.

The temperature may be omitted from the characteristic map, and the characteristic map may indicate only the relationship between the opening degree, the differential pressure before and after the valve, and the flow rate. The flow rate control in the transient state by using the characteristic map is not limited to one which includes: calculating a second flow rate, which is a flow rate of the fluid currently passing through the valve, on the basis of the measured opening degree, the differential pressure before and after the valve, and the temperature; and performing flow rate feedback control depending on the deviation between the target flow rate and the second flow rate. For example, the flow rate control apparatus may be designed to calculate a target opening degree that needs to be set from the characteristic map on the basis of the target flow rate, the differential pressure before and after the valve, and the temperature, so that the feed-forward control of opening degree can be carried out so as to immediately apply an applied voltage at which the measured opening degree reaches the target opening degree.

Various combinations of embodiments and various modifications may be made without departing from the spirit and scope of the present invention.

LIST OF REFERENCE CHARACTERS 100 mass flow controller (flow rate control apparatus)
1 flow rate sensor
P0 upstream-side pressure sensor
11 restrictor, shunting element (fluid resistance element)
P1 first pressure sensor
12 first flow rate calculation section
13 branch pipe
14 winding resistance
15 high resistance flow channel
16 low resistance flow channel
17 three-way valve (switching valve)
2 valve
24 position sensor
3 characteristic map storage section
4 second flow rate calculation section
5 state determination section
6 valve control section
7 map update section

What is claimed is:

1. A flow rate control apparatus comprising:
a valve provided with a position sensor to measure an opening degree and disposed in a flow channel that permits passage of a fluid;
a flow rate sensor disposed upstream of the valve and provided with a fluid resistance element, the flow rate sensor being designed to output a first flow rate;
a first pressure sensor disposed downstream of the fluid resistance element and disposed upstream of the valve, wherein the first pressure sensor is configured to measure a first pressure of the fluid between the fluid resistance element and the valve;
a control circuit configured to:
store a characteristic map indicating a relationship between at least an opening degree of the valve, a differential pressure before and after the valve, and a flow rate of a fluid passing through the flow channel;
calculate a second flow rate from the characteristic map on a basis of a measured opening degree measured by the position sensor and the first pressure measured by the first pressure sensor;
determine whether a flow rate of a fluid passing through the flow channel is in a stable state or a transient state; and
control the valve so that a flow rate of a fluid passing through the flow channel reaches a target flow rate,
wherein, when the flow rate is determined to be in a stable state, control an opening degree of the valve on a basis of the target flow rate and the first flow rate outputted from the flow rate sensor, and
wherein, when the flow rate is determined to be in a transient state, control an opening degree of the valve on a basis of the target flow rate and a second flow rate.

2. The flow rate control apparatus according to claim 1, wherein the control circuit is further configured to update the characteristic map when the flow rate is determined to be in a stable state, on a basis of the first flow rate being measured by the flow rate sensor, the first pressure being measured by the first pressure sensor, and a measured opening degree being measured by the position sensor.

3. The flow rate control apparatus according to claim 1, wherein the characteristic map indicates a relationship between a temperature of the fluid, an opening degree of the valve, a differential pressure before and after the valve, and a flow rate of a fluid passing through the flow channel.

4. The flow rate control apparatus according to claim 1, further comprising a second pressure sensor disposed downstream of the valve,
wherein the control circuit is further configured to calculate a second flow rate from the characteristic map on a basis of a measured opening degree being measured by the position sensor, the first pressure being measured by the first pressure sensor, and a second pressure being measured by the second pressure sensor.

5. The flow rate control apparatus according to claim 4, wherein, when the flow rate is determined to be in a stable state, the control circuit is further configured to update the characteristic map on a basis of the first flow rate being measured by the flow rate sensor, the first pressure being measured by the first pressure sensor, a second pressure being measured by the second pressure sensor, and a measured opening degree being measured by the position sensor.

6. The flow rate control apparatus according to claim 1, wherein the flow rate sensor further comprises
an upstream-side pressure sensor disposed upstream of the fluid resistance element, wherein the control circuit is further configured
to calculate the first flow rate on a basis of an upstream-side pressure measured by the upstream-side pressure sensor and the first pressure measured by the first pressure sensor.

7. The flow rate control apparatus according to claim 1, wherein the flow rate sensor further comprises:
a branch pipe branched from an upstream side of the fluid resistance element and joined to a downstream side of the fluid resistance element; and
a pair of winding resistances disposed in the branch pipe, wherein the control circuit is further configured to calculate the first flow rate on a basis of output of the pair of winding resistances.

8. A flow rate control apparatus comprising:
a valve provided with a position sensor to measure an opening degree and disposed in a flow channel that permits passage of a fluid;
a flow rate sensor disposed downstream of the valve and provided with a fluid resistance element, the flow rate sensor being designed to output a first flow rate;
a first pressure sensor disposed downstream of the fluid resistance element and disposed upstream of the valve, wherein the first pressure sensor is configured to measure a first pressure of the fluid between the fluid resistance element and the valve;
a control circuit configured to:
store a characteristic map indicating a relationship between at least an opening degree of the valve, a differential pressure before and after the valve, and a flow rate of a fluid passing through the flow channel;
calculate a second flow rate from the characteristic map on a basis of a measured opening degree measured by the position sensor and the first pressure being measured by the first pressure sensor;
determine whether a flow rate of the fluid passing through the flow channel is in a stable state or a transient state; and
control the valve so that the flow rate of the fluid passing through the flow channel reaches a target flow rate,
wherein, when the flow rate is determined to be in a stable state, control an opening degree of the valve on a basis of the target flow rate and the first flow rate outputted from the flow rate sensor,
wherein, when the flow rate is determined to be in a transient state, control an opening degree of the valve on a basis of the target flow rate and a second flow rate, the flow rate sensor further comprising:
a high resistance flow channel provided with the fluid resistance element;
a low resistance flow channel disposed in parallel to the high resistance flow channel and joined through a terminal end to the high resistance flow channel; and
a switching valve to perform switching between the high resistance flow channel and the low resistance flow channel so that a fluid passes through one of the flow channels,
wherein, when the flow rate is determined to be in a transient state, the switching valve is designed to permit passage of a fluid into the low resistance flow channel.

9. A flow rate control apparatus comprising:
a valve provided with a position sensor to measure an opening degree and disposed in a flow channel that permits passage of a fluid;
a flow rate sensor disposed upstream of the valve and provided with a fluid resistance element;
a first pressure sensor disposed downstream of the fluid resistance element and disposed upstream of the valve, wherein the first pressure sensor is configured to measure a first pressure of the fluid between the fluid resistance element and the valve;
a second pressure sensor disposed downstream of the valve; and
a control circuit configured to:
store a characteristic map indicating a relationship between at least an opening degree of the valve, a differential pressure before and after the valve, and a flow rate of a fluid passing through the flow channel; and
control an opening degree of the valve so that a flow rate of a fluid passing through the flow channel reaches a target flow rate,
wherein, when a target flow rate is in a transient state, determine a target opening degree from the characteristic map on a basis of the target flow rate being accepted and the first pressure measured by the first pressure sensor, and control an opening degree of the valve so that a measured opening degree measured by the position sensor reaches the target opening degree.

10. A memory storage device having recorded therein a program for a flow rate control apparatus comprising a valve provided with a position sensor to measure an opening degree and disposed in a flow channel that permits passage of a fluid, a flow rate sensor disposed upstream of the valve and provided with a fluid resistance element, the flow rate sensor being designed to output a first flow rate, and a first pressure sensor disposed downstream of the fluid resistance element and disposed upstream of the valve, wherein the first pressure sensor is configured to measure a first pressure of the fluid between the fluid resistance element and the valve,
the program recording medium causing a computer to:
store a characteristic map indicating a relationship between at least an opening degree of the valve, a differential pressure before and after the valve, and a flow rate of a fluid passing through the flow channel;
calculate a second flow rate from the characteristic map on a basis of a measured opening degree measured by the position sensor and the first pressure measured by the first pressure sensor;
determine whether a flow rate of a fluid passing through the flow channel is in a stable state or a transient state; and
control the valve so that a flow rate of the fluid passing through the flow channel reaches a target flow rate, wherein, when the flow rate is determined to be in a stable state, control an opening degree of the valve on a basis of the target flow rate and the first flow rate outputted from the flow rate sensor, and wherein, when the flow rate is determined to be in a transient state, control an opening degree of the valve on a basis of the target flow rate and a second flow rate on a basis of a measured opening degree measured by the position sensor.

* * * * *